Patented Dec. 8, 1931

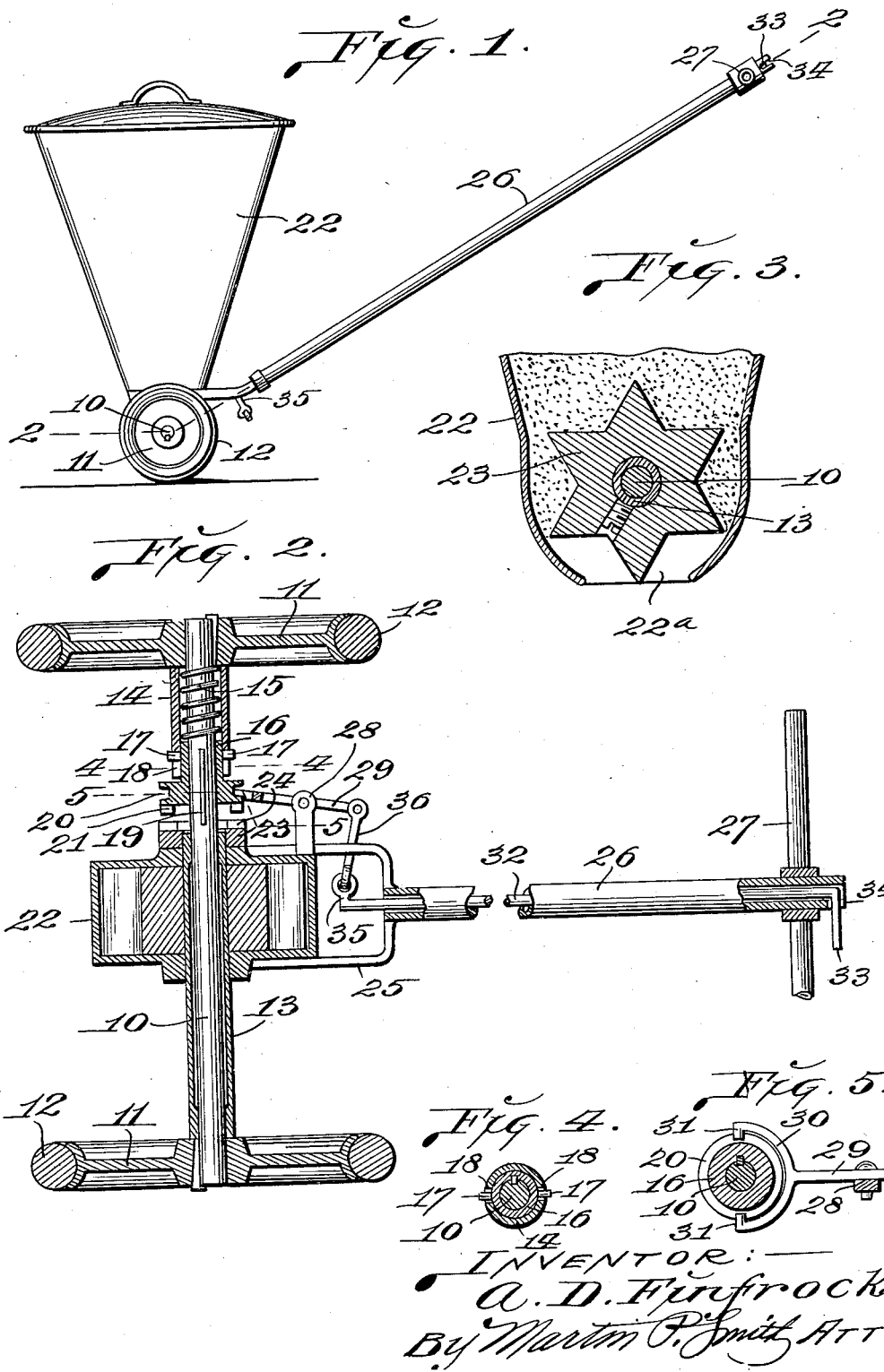

1,835,641

UNITED STATES PATENT OFFICE

ASA D. FINFROCK, OF VENTURA, CALIFORNIA

LINE MARKER FOR ATHLETIC FIELDS

Application filed July 27, 1929. Serial No. 381,668.

My invention relates to a line marker for athletic fields and has for its principal object, the provision of a relatively simple, practical an inexpensive device that may be conveniently pushed or drawn over the ground for the purpose of depositing thereupon, pulverized white material such as lime, plaster of Paris and the like, for the purpose of defining the boundary lines of games that are played upon the field, for instance, tennis, football, baseball and the like.

Further objects of my invention are, to provide a line marker of the character referred to, wherein an agitator is utilized for effecting the discharge of pulverized marking material from a hopper, which agitator is actuated by means of a clutch that is carried upon a wheel supported shaft and further, to provide simple and efficient means under control of the operator of the device for manually throwing the clutch into and out of engagement with the agitator thereby controlling the discharge of marking material from the hopper.

With the foregoing and other objects in view, my invention consists in certain novel features of construction and arrangement of parts that will hereinafter be more fully described and claimed and illustrated in the accompanying drawings, in which:

Fig. 1 is a side elevational view of a line marking device constructed in accordance with my invention.

Fig. 2 is an enlarged horizontal section taken on the line 2—2 of Fig. 1.

Fig. 3 is an enlarged detail section taken through the lower portion of the hopper and showing the agitator therein.

Fig. 4 is a cross section taken on the line 4—4 of Fig. 2.

Fig. 5 is a cross section taken on the line 5—5 of Fig. 2.

Referring by numerals to the accompanying drawings which illustrate a practical embodiment of my invention, 10 designates a shaft, preferably a solid metal rod, on the ends of which are detachably secured suitable wheels 11, preferably of the type having cushion tires 12 and loosely mounted on the shaft 10 between the wheels are sleeves 13 and 14. The internal diameter of sleeve 14, and which latter is somewhat shorter than sleeve 13, is slightly larger than the external diameter of shaft 10, and arranged within said sleeve 14 is an expansive coil spring 15.

Arranged for sliding movement within the inner end of sleeve 14 is a collar 16 from which projects pins 17 that occupy short longitudinal slots 18 in the inner end of sleeve 14 and said collar is mounted so as to rotate with shaft 10 by means of a key or feather 19 that is seated in shaft 10 and which occupies a slot in said collar.

Formed in the enlarged outer end of collar 16 is a groove 20 and formed on the inner end of said collar are lugs or teeth 21 which constitute a clutch face.

The lower portion of a hopper 22, preferably of sheet metal, surrounds the inner portion of the longer sleeve 13 and fixed on said sleeve within the lower portion of said hopper is an agitator 23, preferably a star shaped member.

Formed in the lower end of the hopper, immediately beneath the agitator is an opening 22ª through which the marking material is discharged by said agitator during its rotation.

The inner end portion of sleeve 13 projects slightly beyond the corresponding wall of the hopper 22 and detachably mounted thereon is a collar 23 having a clutch face 24 that opposes the clutch face on the inner end of collar 16.

Secured to the lower portion of hopper 22 is an outwardly projecting yoke 23, to which is secured the inner end of a tubular member 26 that functions as a handle for pushing or pulling the marker and secured on the outer end of said tubular handle is a cross bar 27 that is manually engaged during operation of the marker.

Projecting laterally from one side of the lower portion of the hopper is a bracket 28 on which is fulcrumed a lever 29, the inner end thereof being formed into a yoke 30 and pins 31 that project from the ends of said yoke engage in clutch 20 in collar 16 (see Fig. 5).

Extending through the tubular member 26 is a loosely mounted rod 32, the outer end of which is bent laterally at right angles to form a short handle 33 that is adapted to occupy a notch 34 in the rear end of tubular member 26.

Depending from the forward end of rod 31 at right angles thereto is a short crank arm 35 and pivotally connected to the end thereof is the inner end of a link 36, the outer end of which is pivotally connected to the rear end of lever 29.

While not in use or while being drawn or pushed over the ground without discharging marking material thereunto the parts of the marker occupy the positions as illustrated in Fig. 2, with the clutch face 21 out of engagement with clutch face 24, and with the clutch actuating parts 29, 36 and 32 retained in their out of service positions by the engagement of the handle 33 in notch 34.

Under such conditions the marker can be drawn or pushed over the ground and shaft 10 carrying the wheels 11 will rotate within sleeve 13 without imparting rotary movement thereto, it being understood that said sleeve carries the agitator 23.

In order to rotate the agitator while the marker is pulled or pushed over the ground, the operator engages handle 33 and draws rod 32 a sufficient distance through the tubular handle 26 to disengage said handle 33 from the notch 34 and rod 32 is now permitted to rotate under the pressure exerted by spring 15 which pressure is transmitted through collar 16, lever 29 and link 36 to rod 32 and following the expansion of spring 15, collar 16 will be moved outwardly in the end of sleeve 14 until clutch face 21 engages clutch face 24 on the end of sleeve 13 and thus said sleeve will be rotated with shaft 10 that carries the wheels 11.

Inasmuch as the agitator 23 is secured on shaft 13, said agitator will be rotated in the lower portion of the hopper 22 and as a result the pulverized material will be discharged from the opening in the lower end of said hopper and will be delivered into the ground to form a mark or line thereon.

To cut off the operation of the agitator it is only necessary to manually operate rod 32 so as to move collar 16 and its clutch face away from the clutch face 24 on the inner end of the agitator carrying sleeve.

Thus it will be seen that I have provided a line marking device that is relatively simple in construction, inexpensive of manufacture and capable of being easily and quickly manipulated so as to control the discharge of marking material from the hopper that forms a part of the device.

It will be understood that minor changes in the size, form and construction of the various parts of my improved line marking device may be made and substituted for those herein shown and described without departing from the spirit of my invention, the scope of which is set forth in the appended claims.

I claim as my invention:

1. In a line marking device, a shaft, wheels secured on the ends of said shaft, a sleeve loosely mounted on said shaft, a hopper having its lower portion surrounding and loosely mounted on the inner portion of said sleeve, an agitator secured on the sleeve within the lower portion of said hopper, a clutch face on the inner end of said sleeve and a spring pressed clutch member carried by the shaft agitator to the clutch face on the inner end of said sleeve, which clutch member is mounted for rotary and sliding movement upon said shaft, a tubular handle connected to the lower portion of said hopper, a rod extending through said handle, operating connections between the inner end of said rod and said clutch, the outer end of the rod being bent at right angles to form a crank arm and the outer end of said tubular handle having a notch for the reception of said crank arm.

2. In a line marking device for athletic fields, a hopper provided in its lower portion with an outlet opening, a sleeve loosely mounted in the lower portion of said hopper above said opening, an agitator secured on said sleeve within the said hopper, a shaft extending through said sleeve, wheels secured on the ends of said shaft, a clutch face on the inner end of said sleeve, a spring pressed clutch member mounted for rotary and sliding movement on said shaft adjacent to said clutch face, a tubular handle secured to and projecting from said hopper, a rod extending through said tubular handle, a yoke fulcrumed on the hopper and engaging said spring pressed clutch member, a ring between the inner end of said rod and the rear end of said yoke, the outer end of said tubular handle having a notch and the outer end a crank arm formed on the outer end of said rod and adapted to occupy said notch.

In testimony whereof I affix my signature.

ASA D. FINFROCK.